US012634701B2

(12) United States Patent
Bilek

(10) Patent No.: US 12,634,701 B2
(45) Date of Patent: May 19, 2026

(54) PROXIMITY-BASED AND MULTI-TIME-BASED DEACTIVATION AND/OR ACTIVATION RELATED TO A TOKEN

(71) Applicant: Capital One Services, LLC, McLean, VA (US)

(72) Inventor: Baris Bilek, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 985 days.

(21) Appl. No.: 17/724,976

(22) Filed: Apr. 20, 2022

(65) Prior Publication Data

US 2023/0345252 A1 Oct. 26, 2023

(51) Int. Cl.
*H04W 12/63* (2021.01)
(52) U.S. Cl.
CPC .................................... *H04W 12/63* (2021.01)
(58) Field of Classification Search
CPC ..... H04W 12/60; H04W 12/61; H04W 12/63; H04W 12/64
See application file for complete search history.

(56) References Cited

U.S. PATENT DOCUMENTS

| | | | | |
|---|---|---|---|---|
| 10,019,707 | B1 * | 7/2018 | Sangi | .................... G06Q 20/341 |
| 10,062,263 | B1 * | 8/2018 | Mandali | ................. G08B 21/24 |
| 11,062,583 | B1 * | 7/2021 | Sathaye | ............. G08B 21/0233 |
| 11,317,242 | B1 * | 4/2022 | Allen | .................... H04W 4/023 |
| 2011/0265151 | A1 * | 10/2011 | Furlan | ................. H04L 12/2809 |
| | | | | 726/4 |
| 2016/0189143 | A1 * | 6/2016 | Koeppel | .............. G06Q 20/327 |
| | | | | 705/41 |
| 2016/0335876 | A1 * | 11/2016 | Verma | ..................... G01S 11/06 |
| 2017/0052602 | A1 * | 2/2017 | Gila | .......................... G09G 5/26 |
| 2018/0150734 | A1 * | 5/2018 | Suthar | .............. G06K 19/07718 |
| 2019/0303917 | A1 * | 10/2019 | Locke | ................. G06Q 20/341 |

* cited by examiner

*Primary Examiner* — Jeremy S Duffield
(74) *Attorney, Agent, or Firm* — Foley & Lardner LLP

(57) ABSTRACT

In some embodiments, proximity-based deactivation or activation related to a token (or one or more features related to the token) may be facilitated. As one example, methods and systems are described herein for deactivating use related to a token (e.g., outside a range of a first mobile device communicating with the token via a first link key) based on multiple "outside-of-range" threshold times. As another example, methods and systems are described herein for reactivating (or keeping active) the use related to the token by obtaining a valid link key and communicating with the token via a mobile device (e.g., a second mobile device of another user) within a range of the token.

18 Claims, 8 Drawing Sheets

404

ML Model 402

406

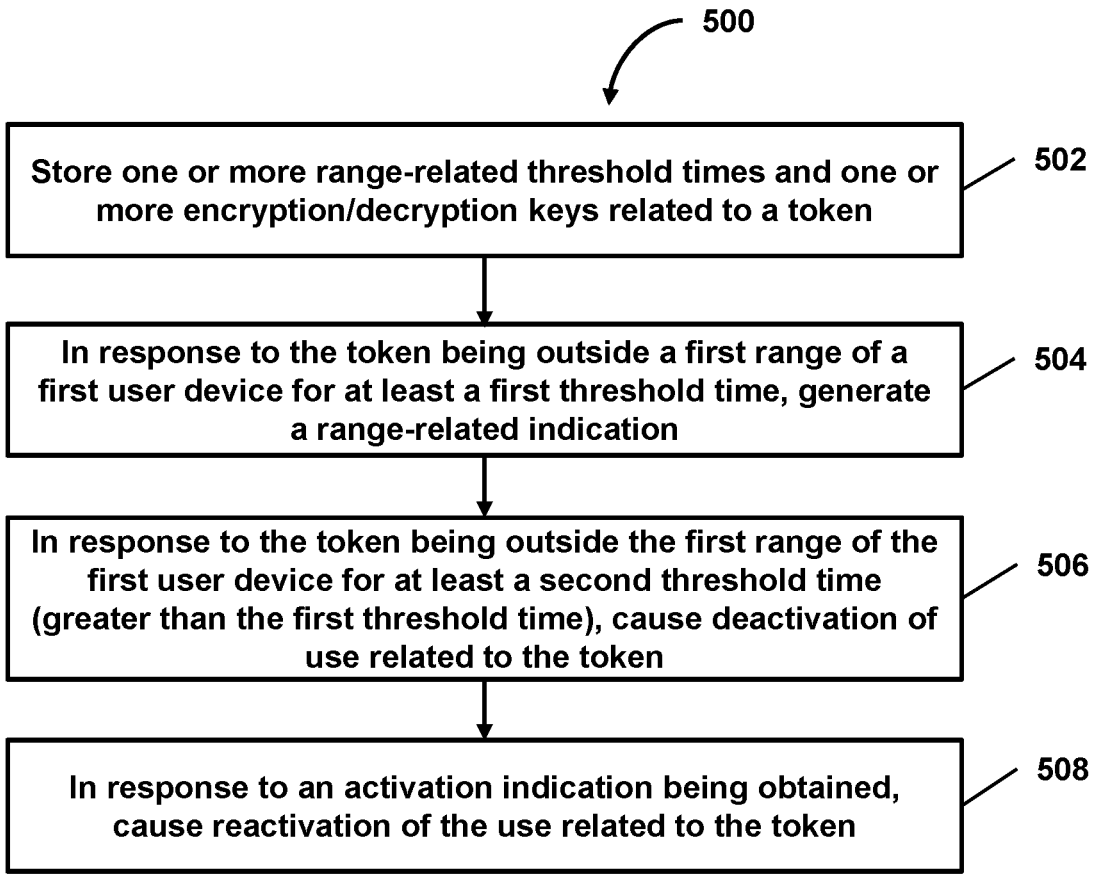

500

Store one or more range-related threshold times and one or more encryption/decryption keys related to a token — 502

In response to the token being outside a first range of a first user device for at least a first threshold time, generate a range-related indication — 504

In response to the token being outside the first range of the first user device for at least a second threshold time (greater than the first threshold time), cause deactivation of use related to the token — 506

In response to an activation indication being obtained, cause reactivation of the use related to the token — 508

FIG. 5

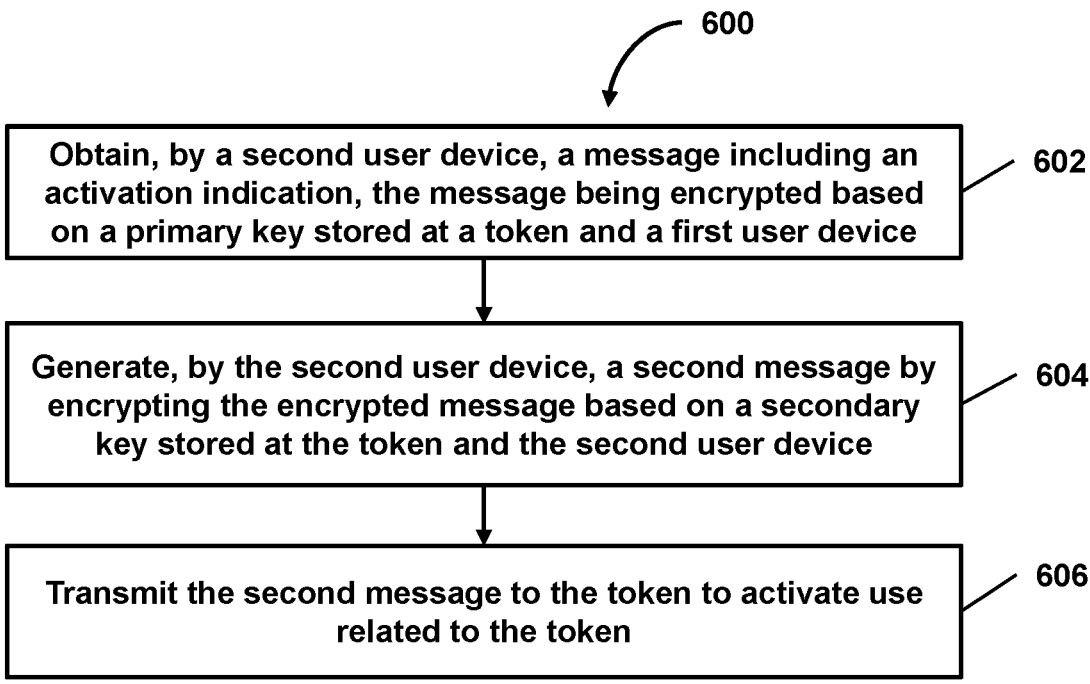

600

Obtain, by a second user device, a message including an activation indication, the message being encrypted based on a primary key stored at a token and a first user device                602

Generate, by the second user device, a second message by encrypting the encrypted message based on a secondary key stored at the token and the second user device                604

Transmit the second message to the token to activate use related to the token                606

FIG. 6

PROXIMITY-BASED AND MULTI-TIME-BASED DEACTIVATION AND/OR ACTIVATION RELATED TO A TOKEN

BACKGROUND

Tokens may be used in computing systems in various ways, including authentication, authorization, or for information exchange. For example, wireless tokens may be used for security or authentication purposes. After a user has been successfully authenticated, an application may request to access routes, services, or resources on behalf of the user.

SUMMARY

Methods and systems are described herein for improvements related to deactivation or activation of use related to a token. As one example, methods and systems are described herein for deactivating use related to a token (e.g., outside a range of a first mobile device communicating with the token via a first link key) based on multiple "outside-of-range" threshold times. As another example, methods and systems are described herein for reactivating (or keeping active) the use related to the token by obtaining a valid link key and communicating with the token via a mobile device (e.g., a second mobile device of another user) within a range of the token.

With respect to existing systems, for example, once a token of a user is outside a wireless communication range of the user's mobile device, the token (or one or more features related to the token) may be deactivated for security purposes (e.g., to prevent others from using the token). While some systems may automatically reactivate the token or its related features once the token is again within the wireless communication range of the user's mobile device, such systems still require the token to be within the wireless communication range of the particular mobile device of the user for such token-related features to be accessible. As such, with respect to such systems, the user may lose access to one or more features of the token if the user leaves behind the particular mobile device or if the token is inadvertently outside of the wireless communication range of the mobile device. Additionally, or alternatively, with respect to such systems, when the token is not within range of the user's mobile device, the user cannot enable another user (e.g., a family member or friend) to use one or more features of the token without substantially increasing the security risks against which the automated deactivation protocol of the token is intended to protect.

In some embodiments, multiple "outside-of range" threshold times may be stored and used to facilitate one or more actions with respect to a token or its related features. In some embodiments, in response to a token being outside of a first range of a first mobile device associated with a first user for at least a first threshold time, a range-related indication may be generated (e.g., to indicate that the token is not within a range of the first mobile device), but the token (or one or more features related to the token) may nevertheless remain activated. In response to the token being outside of the first range of the first mobile device for at least a second threshold time (greater than the first threshold time), a deactivation signal (for deactivating the use of the token) may be generated, which causes the token (or its related features) to be deactivated. In this way, for example, if the first user inadvertently allows the token to be taken outside of the first range of the first mobile device for the first threshold time (but less than the second threshold time), the token or token features will not immediately stop working, and the first user can be notified that the token is "out of range" (e.g., via a notification presented at the first mobile device).

In some embodiments, in response to an activation indication being obtained, a reactivation signal (for reactivating the use of the token) may be generated, which causes the token (or its related feature(s) that was deactivated) to be reactivated. In some embodiments, a second mobile device (e.g., associated with a second user) may transmit the activation indication to the token in the form of a message that has been multi-encrypted with primary and secondary encryption keys stored at the token. As an example, a first message (including the activation indication) may be encrypted based on a primary key stored at the token and the first mobile device. In one use case, the primary key may be a primary link key (e.g., generated during an initialization process between the token and the first mobile device), and the token and the first mobile device may each use their respective copy of the primary link key to generate a first encryption key. The first mobile device may use the first encryption key to encrypt the first message to produce the first encrypted message, and the first mobile device may transmit the first encrypted message (e.g., to the second mobile device). As a further example, the second mobile device may encrypt the first encrypted message based on a secondary key. In one use case, the secondary key may be a secondary link key (e.g., generated during an initialization process between the token and the second mobile device, generated by the token and the first mobile device during a secondary link key generation process, etc.), and the token and the second mobile device may each use their respective copy of the primary link to generate a second encryption key. The second mobile device may use the second encryption key to encrypt a message (including the first encrypted message) to produce the second encrypted message, and the second mobile device may transmit the second encrypted message to the token. In this way, for example, through primary and secondary keys (e.g., link keys, encryption/ decryption keys, etc.) stored at the token, the first mobile device may still securely enable another user (e.g., the second user) near the token to use one or more features of the token.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 5 shows a flowchart of a method of facilitating proximity-based deactivation or activation related to a token, in accordance with one or more embodiments.

FIG. 6 shows a flowchart of a method of facilitating multi-encryption using primary and secondary keys stored at a token, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
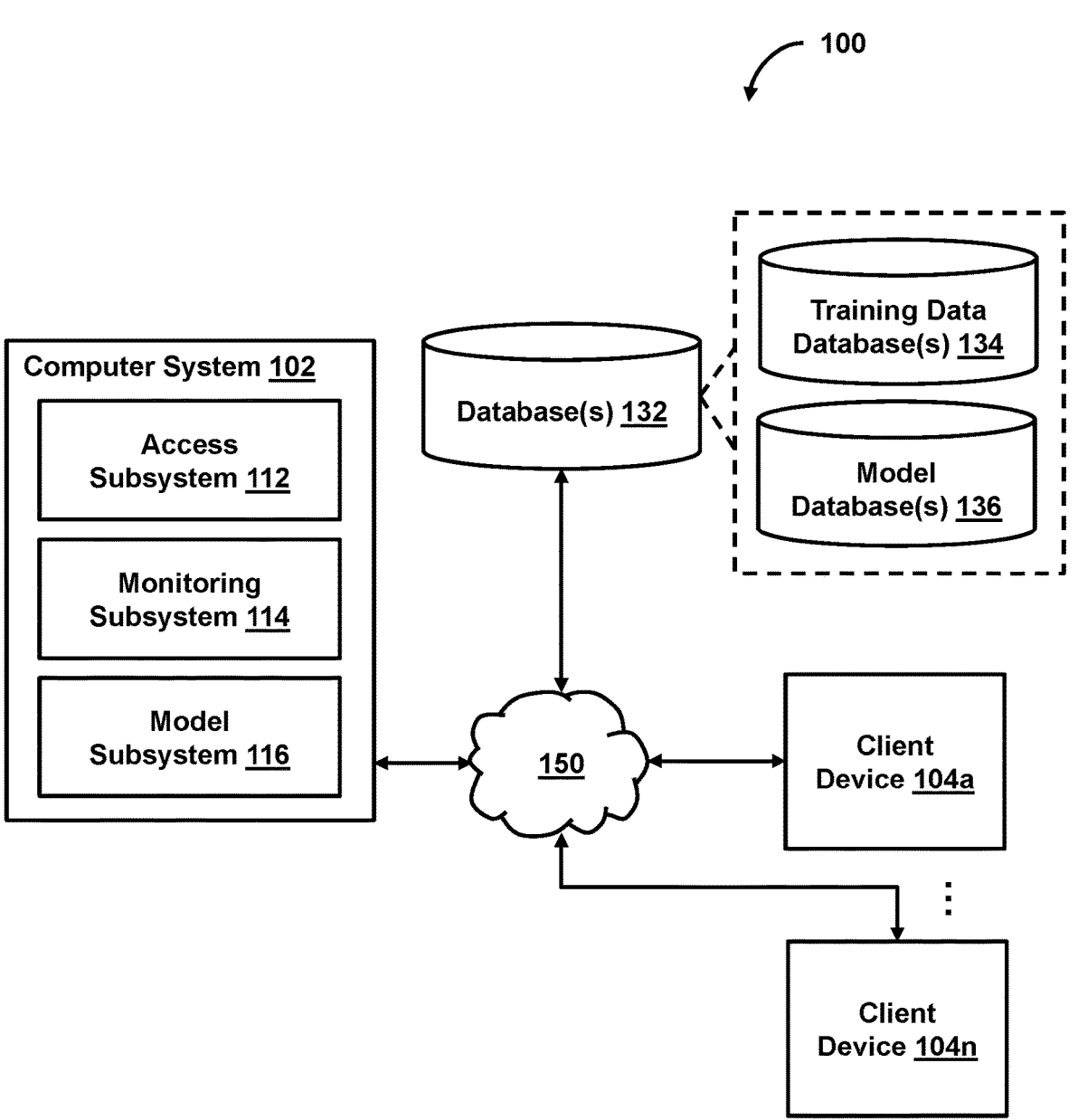
FIG. 1 shows a system for facilitating proximity-based deactivation or activation related to a token, in accordance with one or more embodiments.

FIG. 1 shows a system 100 for facilitating proximity-based deactivation or activation related to a token, in accordance with one or more embodiments. As shown in FIG. 1, system 100 may include computer system 102, client device 104 (or client devices 104a-104n), one or more tokens (e.g., referred to herein), or other components. Computer system 102 may include access subsystem 112, monitoring subsystem 114, model subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. A token may include a premise or data access token (e.g., in the form of a smart access card or dongle), a transaction card, or other token. In some embodiments, the token may have an embedded power source (e.g., a battery, a capacitor, or other components). As an example, where the token includes a battery, the battery may be a solid-state battery (e.g., to increase energy capacity while minimizing weight or volume) or other type of battery. It should be noted that, while one or more operations are described herein as being performed by particular components of computer system 102 or client device 104, those operations may, in some embodiments, be performed by other components of computer system 102 or client device 104 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may cause deactivation of one or more features related to a token based on the token being outside of a first range of a first user device for at least a second threshold time greater than a first threshold time. As an example, the first threshold time may be associated with a first trigger (e.g., corresponding to a notification for the first user device or other action), and the second threshold time may be associated with a second trigger (e.g., corresponding to the deactivation of the related features). The first, second, third, or other threshold times may be static or dynamic threshold times configured by a manufacturer or issuer or predefined by a user. In one use case, in response to the token being outside of the first range of the first user device for at least the first threshold time, a range-related indication may be generated (e.g., to indicate that the token is not within a range of the first user device), but the features related to the token may nevertheless remain activated. In response to the token being outside of the first range of the first user device for at least the second threshold time (greater than the first threshold time), a deactivation signal (for deactivating use of the token) may be generated, which causes the token (or its related features) to be deactivated. In this way, for example, if a first user of the first user device inadvertently allows the token to be taken outside of the first range of the first user device for the first threshold time (but less than the second threshold time), the token or token features will not immediately stop working, and the first user can be notified that the token is "out of range" (e.g., via a notification presented at the first user device).

In some embodiments, system 100 may cause reactivation of the related features based on a corresponding approval or other action (e.g., occurring via the first user device). In some embodiments, system 100 may cause an activation indication to be sent to (or obtained by) the token. As an example, the activation indication may be sent to (or obtained by) the token based on the corresponding approval occurring via the first user device (e.g., a user confirmation or other instruction occurring at the first user device to reactivate or keep active the features related to the token). The token may obtain the activation indication from the first user device, a second user device (e.g., associated with a second user), or other device.

Figure 2A:
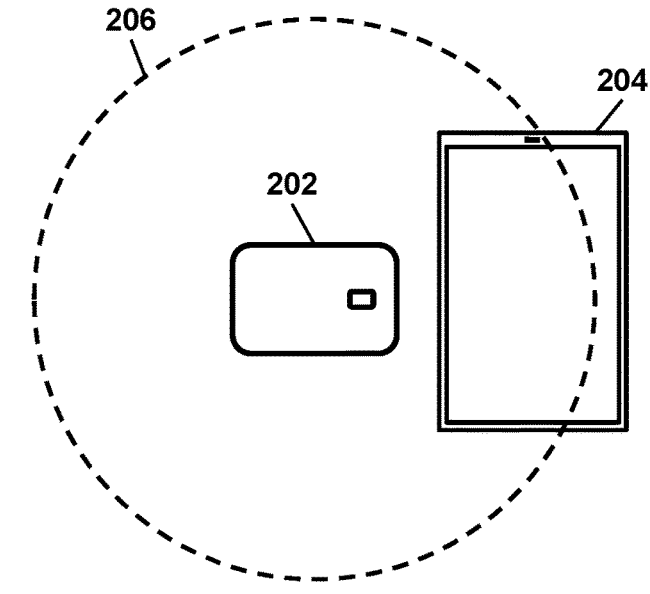
FIGS. 2A and 2B show scenarios involving a token and a mobile device, in accordance with one or more embodiments.

In one scenario, with respect to FIG. 2A, token 202 may initially transmit data signals at respective power levels that enable a device within its transmission region 206 to receive its transmitted data signals. Upon detecting that the mobile device 204 is outside the transmission region 206 for at least a first threshold time (e.g., 10 secs, 30 secs, etc.), one or more components of system 100 may generate a range-related indication. The range-related indication may indicate that the token 202 is not within a first range of the mobile device 204 (e.g., the mobile device 204 is not within the transmission region 206). As an example, with respect to FIG. 2B, where the range-related indication is generated by the token 202, the token 202 may detect that the token 202 has been outside of the first range of the mobile device 204 for the first threshold time based on a determination that the token 202 has not obtained a response from the mobile device 204 (e.g., a response to a message transmitted by the token 202 at a first transmission power level corresponding to the transmission region 206) for an amount of time greater than or equal to the first threshold time. Based on such detection, the token 202 may increase its transmission power level (e.g., from a first power level to a second power level) and transmit the range-related indication or other information at the increased transmission power level (e.g., corresponding to transmission region 208) to the mobile device 204. Thus, for example, even where the token 202 only has certain short-range wireless communication capabilities (e.g., Bluetooth), the token 202 and mobile device 204 may continue to communicate (despite being outside of the first range), enabling a user of the token 202 and the mobile device 204 to (i) return to the token 202 or the mobile device 204 (e.g., depending on which device is currently in the user's possession) to keep active one or more features related to the token 202, (ii) to extend the time delay period before the token 202 becomes deactivated, (iii) to enable another user device (e.g., a second mobile device associated with another user) to communicate with the token 202 to reactivate or keep active the related features, or (iv) perform other actions requiring interaction with the token 202.

In some embodiments, based on a token being outside of a first range of a first user device for at least a threshold time (e.g., greater than a first threshold time), the token may exhibit a second condition corresponding to deactivation (e.g., different from a first condition exhibited by the token when the features related to the token are active). As an example, the token may cause a surface of the token to exhibit a first physical condition (e.g., exhibit a first color or other physical condition) when the related features are active, and the token may cause the surface of the token to exhibit a second physical condition (e.g., exhibiting a second color or other physical condition) when the related features are deactivated. In one scenario, the second physical condition may include the surface of the token being substantially a single color (e.g., black, white, a color of the surface when no ink is present on the surface, etc.). As another example, the second condition may include a number (e.g., an account number, a card number, etc.) or other data (e.g., account or card owner name, expiration date, card verification value, etc.) presented on the electrophoretic surface of the token being cleared from the surface.

Figure 3A:
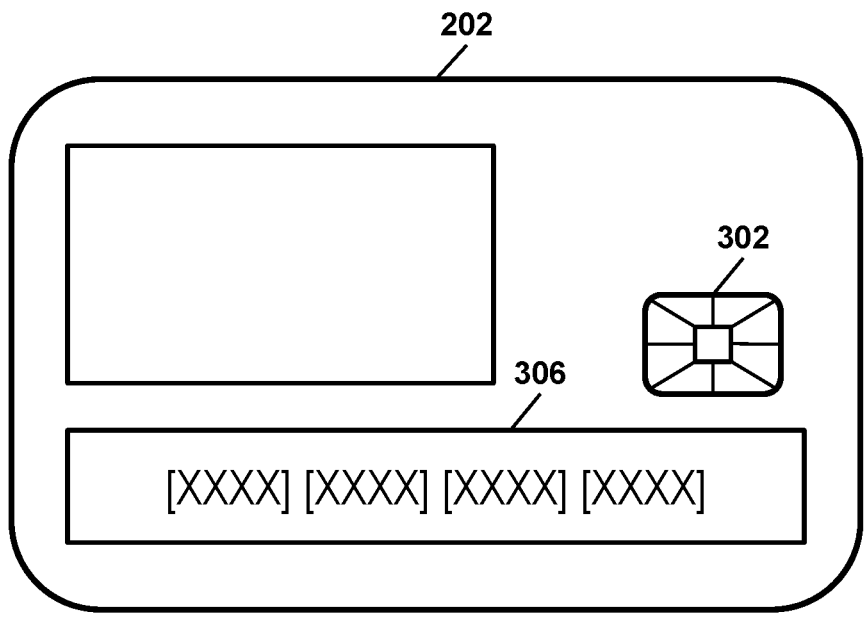
FIGS. 3A and 3B show scenarios involving activated and deactivated features related to a token, in accordance with one or more embodiments.
Figure 3B:
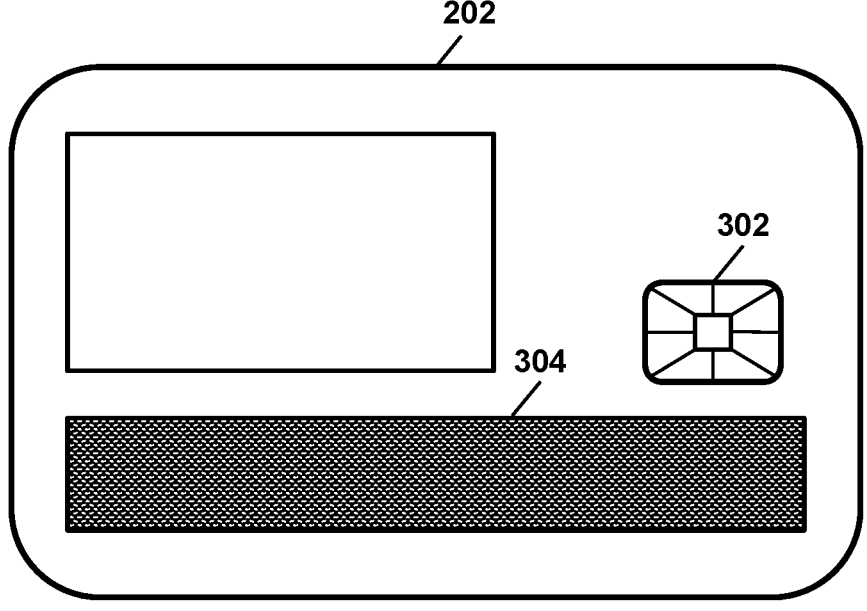

In one scenario, with respect to FIG. 3A, when use of the token 202 is activated, the chip 302 is enabled, and data is presented on a region 306 (e.g., a token identifier, an owner name, expiration date, verification value, or other data may be presented on an electrophoretic display of token 202). In a further scenario, with respect to FIG. 3B, based on detecting that the token 202 has been outside of the first range of the first user device for the threshold time, the token 202 may disable the chip 302 (e.g., a EMV chip or other chip) for processing a transaction. In another scenario, based on such detection, the token 202 may apply an electric field across the region 304 (e.g., an electrophoretic display) to cause the region 304 to become substantially a single color, thereby also clearing the previously presented data from the region 304. In a further scenario, when a reactivation signal (e.g., to reactivate the use of the token) is obtained, the token 202 may reenable the chip 302, and the token 202 may apply an electric field across the region 304 to redisplay the previously presented data on the region 304. As such, for example, when the use of the token 202 is deactivated, certain data (that can be used to access one or more features related to the token) is not readily available on the surface of the token 202, and one or more components (e.g., chip 302) that is typically used to access the related features are disabled, thereby preventing unauthorized access to such features.

System Components

In some embodiments, access subsystem 112 may manage access to one or more services or other features related to a token. As an example, where the token is used to access one or more network services of computer system 102, access subsystem 112 may activate or deactivate access to such network services. As a further example, where the token is a transaction card (e.g., credit card, debit card, or other payment card), access subsystem 112 may activate or deactivate (i) access of the particular transaction card to one or more accounts of the user or specific features of such accounts, (ii) access of multiple or all transaction cards associated with the same account to the given account or specific features of the account, (iii) use of an account identifier to access the associated account or its account features (e.g., suspending or canceling the account or certain features of the account such that such features cannot be accessed regardless of whether card swipe or manual entry of a card number is used), or (iv) other accesses.

In some embodiments, monitoring subsystem 114 may monitor for occurrence of one or more triggers related to (i) activation/deactivation of access to one or more services or other features related to one or more tokens associated with one or more users or (ii) other actions (e.g., transmission of notifications to one or more user devices). As an example, based on such monitoring, monitoring subsystem 114 may detect that a token of a user has been outside a range of a user device of the user for at least a threshold time and generate a corresponding indication to access subsystem 112 (e.g., indicating the occurrence of this particular trigger). As another example, based on obtaining a range-related indication from the user device, the token, or another device (e.g., that the token has been outside the range of the user device for an amount of time satisfying the first threshold time), monitoring subsystem 114 may transmit one or more notifications to one or more user devices (e.g., to present an alert at other user devices of the user that the token is outside of the range, to present a prompt at the user device of the user to a user instruction on a next action to take, etc.).

As another example, in response to detecting that the token has been outside the range of the user device for at least a second threshold time (greater than the first threshold time), monitoring subsystem 114 may generate an indication to access subsystem 112 that an occurrence of the trigger corresponding to performing an outside-of-range deactivation protocol. In one scenario (e.g., where the token is a transaction card), upon receiving such indication, access subsystem 112 may deactivate (i) access of the particular transaction card to one or more accounts of the user or specific features of such accounts, (ii) access of multiple or all transaction cards associated with the same account as the transaction card to the given account or specific features of the account, (iii) use of an account identifier to access the associated account or its account features, or (iv) other accesses. Such deactivation may, for example, including cancellation of the associated account or replacing the associated account with a new account (e.g., a replacement account with the same features as the replaced account). In another scenario, upon receiving such indication, access subsystem 112 may limit use of the associated account to one or more locations (e.g., a home location associated with the user, a current location of the user, one or more favorite locations of the user, etc.), one or more merchants or merchant categories (e.g., one or more merchants or categories frequently visited by the user, one or more merchants or categories predefined by the user as merchants/categories not to be blocked, etc.), one or more threshold spend amounts (e.g., a threshold spend amount per transaction, a threshold spend amount per day, month, or other time period, or other threshold spent amount).

In some embodiments, monitoring subsystem 114 may monitor current locations or last known locations of the token, the user device, or other devices and perform actions related to an automated deactivation/reactivation protocol based on the monitored location information. As an example, if the current or last known location of a token is known to be a home of the user of the token (e.g., an account owner of an account associated with the token) or a work location (e.g., a primary office) of the user, monitoring subsystem 114 may determine that one or more actions of a set of actions (e.g., automated notification or feature deactivation of an outside-of-range deactivation protocol) should not be performed. Such determinations may, for example, be based on the user frequently leaving the token at such locations (e.g., home or work), the user frequently overriding the automated deactivation of the features related to the token when the token is left at such locations, or other criteria. As another example, if a given location is determined to a "semi-safe" location (e.g., a restaurant or a friend's house), monitoring subsystem 114 may determine that one or more actions of the set of actions should be performed while one or more other actions of the set of actions should not be performed (e.g., performing the automated notification at the corresponding user device indicating that the token is "outside of range," while suspending the automated feature deactivation). In some embodiments, as described herein, such location information and rules may be updated based on one or more user selection of locations and applicable rules or user preferences or via one or more rule-based or machine learning systems.

In some embodiments, monitoring subsystem 114 may store and use different sets of threshold times for different locations or types of locations (e.g., home, work, frequently visited location, restaurant, grocery store, or other location labels, etc.). In some embodiments, monitoring subsystem 114 may provide and update one or more user devices or tokens with the appropriate sets of threshold times (e.g., and such threshold times may be stored at the user devices or tokens). As an example, a first set of threshold times may be associated with a first location (e.g., a location labeled as "semi-safe"), a second set of threshold times may be associated with a second location (e.g., a location labeled as "no-label" or "not safe"), a third set of threshold times may be associated with a third location, and so on. As an example, each set of threshold times may include a first threshold time (e.g., 30 seconds, 1 minute, 2 minutes, etc.) associated with a notification of a token being outside of a range of a user device, a second threshold time associated with deactivation of one or more features related to the token (e.g., 2 minutes, 5 minutes, 10 minutes, 30 minutes, etc.), or one or more other threshold times associated with one or more other actions. In some embodiments, as described herein, one or more such sets of threshold times may be updated based on one or more user selection of threshold times and actions or user preferences or via one or more rule-based or machine learning systems.

In some embodiments, to facilitate such outside-of-range detection and communication among tokens and other devices, these devices may each store one or more respective keys for communicating with one another. In some embodiments, when a token of a first user and a user device of the first user are communicating for the first time, the two devices may go through an initialization phase involving link key generation. As an example, the devices may use identical key generation input data (e.g., identical PINs) pre-stored at or otherwise obtained by the devices (e.g., pre-stored by a manufacturer or issuer, obtained via a secure app on the user device, etc.) to generate their respective link keys (e.g., identical link keys). Each device may then use its respective link key as an input to one or more cryptographic algorithms to generate matching sequences.

Figure 4A:
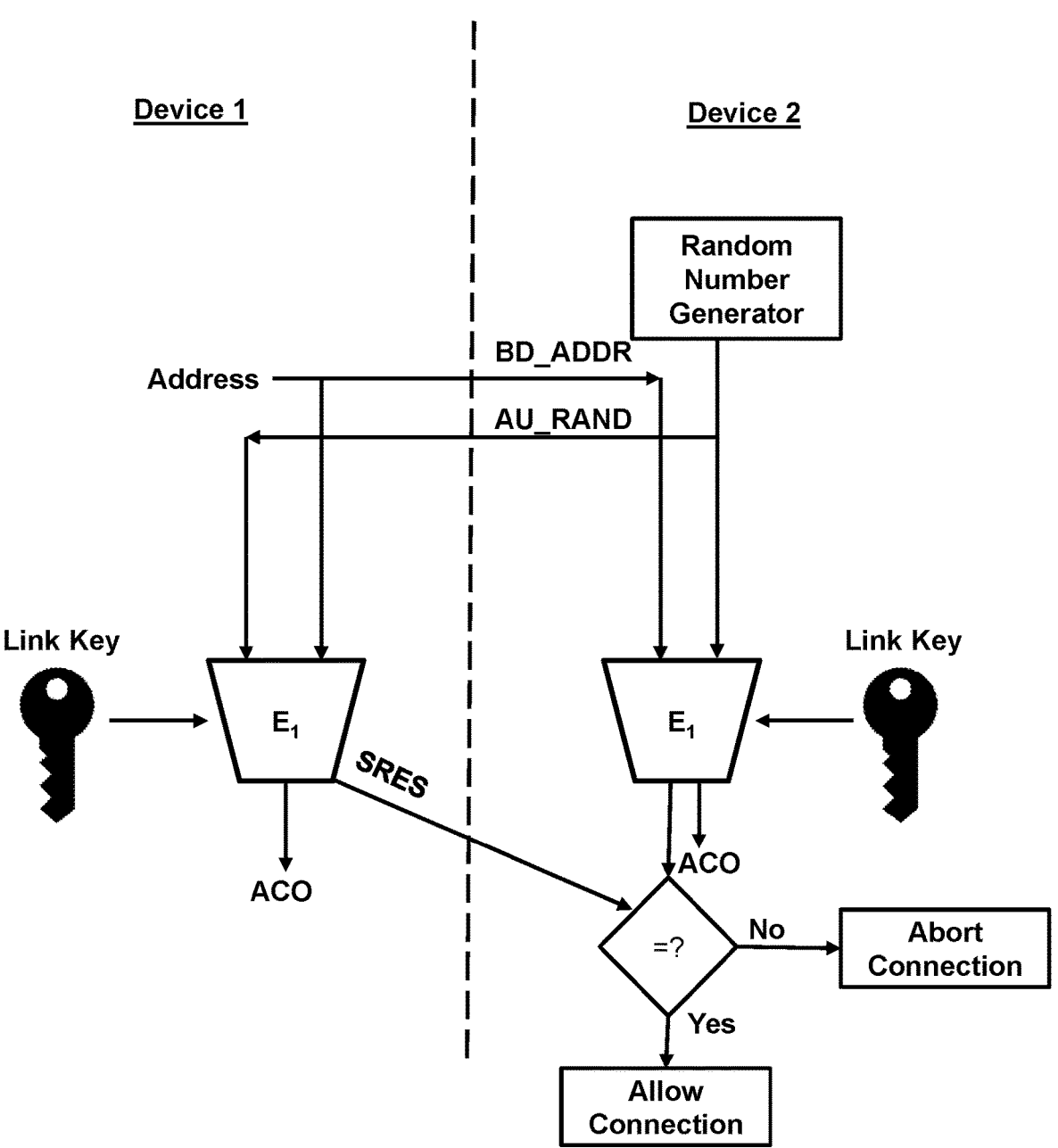
FIGS. 4A and 4B shows scenarios involving an initiation phase and encrypted communications between a token and a user device, in accordance with one or more embodiments.

In some embodiments, the devices may perform authentication through a challenge-response scheme to verify that the device requesting access has the secret link key. As an example, with respect to FIG. 4A, the requesting device first sends its unique device address to the verifying device. The verifying device then sends a random challenge (e.g., 128-bit or other length challenge) from a random number generator. Both devices may use an E1 algorithm on the random challenge, the device address, and the link key to yield a result (e.g., 32-bit or other length result). The verifying device then compares the two results and authenticates the requesting device if the results match.

Figure 4B:
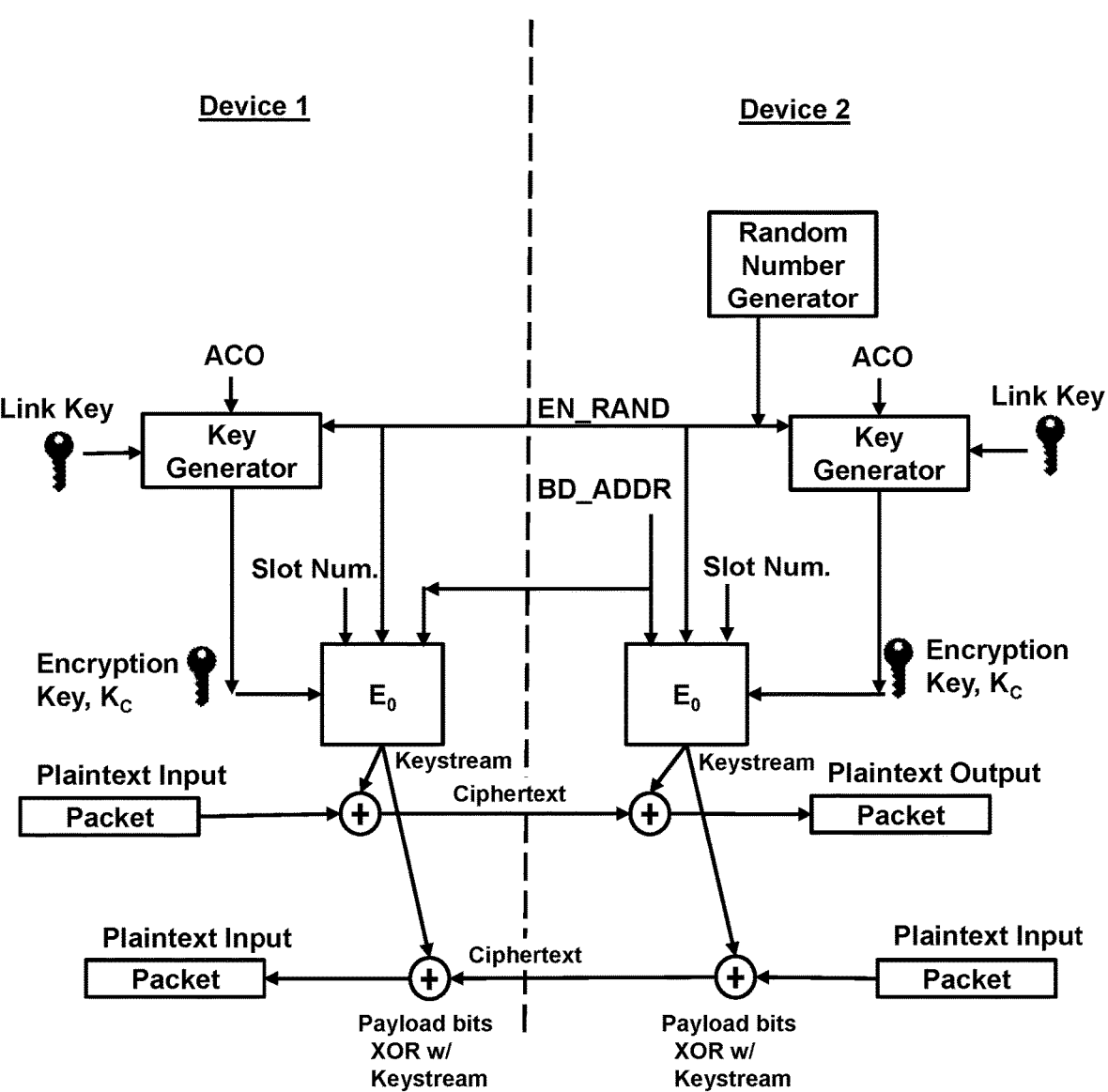

In some embodiments, each device may use its respective link key as input to a key generator to generate its own copy of an encryption key to securely communicate with one another (e.g., to protect the payloads of packets being exchanged between the two devices). As an example, with respect to FIG. 4B, the encryption key is produced from an internal key generator that takes as input: the link key, a random number, and a value from the authentication procedure. Each device may use the E0 algorithm to generate a keystream by inputting the device address, a random number, a slot number, and the encryption key to the algorithm. The devices may then use the key stream to encrypt each data packet changes on a per-packet basis (e.g., using a different slot number each time, while other variables may remain the same). As shown in FIG. 4B, the key stream may be XORed with payload information bits, and the resulting ciphertext may be transmitted to the receiving device.

In some embodiments, access subsystem 112 may store (i) one or more keys stored at a token (e.g., a link key or other key), (ii) key generation input data stored at the token (e.g., one or more pre-stored PINs for generating a link key or other key), or (ii) or other data stored at the token (e.g., a friendly name of the token via which other devices can use to poll for the token). As an example, access subsystem 112 may use such stored data to facilitate reactivation of the token (or one or more features related to the token) or other communications with the token. In one scenario, if a first user (e.g., who is an account owner of a transaction card account) loses a user device previously paired with the transaction card, the first user may log into a network service (e.g., a service the bank or issuer of the transaction card) to send the corresponding data (e.g., for securely communicating with the transaction card) to a user application on another user device of the first user. If the corresponding data received from the network service is a PIN stored at the transaction card, the user application and the transaction card may each use the PIN to generate a new link key via which the transaction card and the other user device may securely communicate with one another (e.g., as described herein with respect to FIGS. 4A-4B or other techniques). If the corresponding data received from the network service is a link key stored at the transaction card, the user application may use the link key to securely communicate with the transaction card (e.g., without needing the other user device to perform the pairing process with the transaction card).

In another scenario, if the first user wants to enable one or more other users (e.g., a family member, friend, colleague, etc.) to gain access to the transaction card (or one or more features related to the transaction card), the first user may use the user's application to authorize a second user. As an example, similar to the foregoing scenario, the network service may send the corresponding data (e.g., for securely communicating with the transaction card) to a second user application on a second user device of the second user. As another example, the first user's device (e.g., the user application on the first user device) may store the corresponding data (e.g., the PINs, the link key, etc.), and the first user device may send the corresponding data to the second user device (e.g., via the network service, via a direct peer-to-peer connection, etc.). As another example, the first user's authorization may be limited to a temporary time period, and the link key obtained or generated by the second user application may associated with an expiration time and may only be valid for securely communicating with the transaction card before such expiration time (e.g., one hour from the first time the link key is used to communicate with the transaction card or other expiration time). In this way, for example, if the first user leaves the transaction card at a restaurant or other location with the second user (e.g., a family member, friend, colleague, etc.), the first user may enable the second user to use one or more features related to the transaction card by securely communicating with the transaction card and reactivating (or keeping active) the token or its related features (e.g., while an automated deactivation protocol of the transaction card remains in place despite the first user leaving the transaction card at the location).

In some embodiments, access subsystem 112 may store (i) one or more secondary keys stored at a token (e.g., a secondary link key or other key), (ii) key generation input data stored at the token for generating a secondary key (e.g., one or more pre-stored PINs for generating a secondary link key or other key), or (ii) or other data stored at the token. As indicated herein, a first user device (e.g., of a first user of the token) may additionally or alternatively store or use such data to facilitate reactivation of the token (or one or more features related to the token) or other communications with the token. As used herein, as compared to a primary key, a secondary key is a key corresponding to less features related to the token or a key subject to additional requirements or limitations for securely communicating with the token. In one use case (e.g., where the token is a transaction card), when the first user device is near the transaction card (e.g., within a first range) and using a primary link key to communicate with the token, use of the transaction card (or its corresponding card data) may not be limited to any particular set of merchants, merchant categories, product categories, locations, or threshold transaction spend amounts. On the other hand, if the first user device is not near the transaction card (e.g., outside of the first range) or the features related to the transaction card is otherwise deactivated, a second user device (e.g., of the first user, a second user, etc.) near the transaction card that obtains a valid secondary link key (for communicating with the transaction card) may only be able to reactivate some portions of the deactivated features. As an example, upon reactivation, use of the transaction card (or its corresponding card data) may be limited to certain merchants, merchant categories, product categories, locations, threshold transaction spend amounts (e.g., per-transaction or other thresholds), or other criteria.

In another use case, if the first user device is not near the token (e.g., outside of the first range) or the features related to the token is otherwise deactivated, the second user device with a valid secondary link key may only be able to act as a proxy or intermediary device for reactivating one or more of the deactivated features on behalf of the first user device (or another user device having a valid primary link key for communicating with the token). As an example, the token (e.g., a transaction card or other token) may be configured to decrypt a message from the second user device by: (i) using a secondary encryption key derived from the secondary link key to extract a primary-key-encrypted message from the message; (ii) using a primary encryption key derived from the primary link key to extract the plaintext message (e.g., the plaintext of an activation indication or other information) from the primary-key-encrypted message. As a further example, it may be the first user device that generated the primary-key-encrypted message by using the primary encryption key (derived from the primary link key at the first user device) to encrypt the plaintext message to produce the primary-key-encrypted message. Upon receiving the primary-key-encrypted message (e.g., via a network service, via a peer-to-peer connection with the first user device, etc.), the second user device uses the secondary encryption key (derived from the secondary link key at the second user device) to encrypt the primary-key-encrypted message to produce the multi-encrypted message. In this way, for example, the first user of the token may use one or more other user devices (e.g., via the network service, via one or more peer-to-peer connections, etc.) to communicate with the token to reactivate or keep active the deactivated/related features without necessarily granting the other user devices (or other users) an ability to independently communicate substantively with the transaction card.

In some embodiments, as indicated herein, a token may create and store one or more keys (e.g., multiple link keys), such as a first key for facilitating encryption/decryption of messages intended for or from a first user device, a second key for encryption/decryption of messages intended for or from another user device (e.g., a second user device), or other keys. In some embodiments, based on detecting that the token is outside a first range of the first user device for at least a given threshold time (e.g., the first threshold time, the second threshold time, or another threshold time), the token may generate a message that includes key generation input data (e.g., a randomly-generated PIN for generating the second key), and the token may transmit the message at a higher transmission power level (corresponding to a range higher than the first range) to the first user device. Due to the higher range, the first user device may receive the key generation input data from the token, and the token and the first user device (or another device to which the key generation input is provided) may each use the key generation input data to generate an instance of the second key (such that each instance is an exact copy of the second key). Additionally, or alternatively, based on detecting that the token is outside the first range of the first user device for at least the given threshold time (or other threshold time), the first user device may generate a message that includes the key generation input data and transmit the message at a higher transmission power level (corresponding to a range higher than the first range) to the token. As discussed herein, in some scenarios, where the second key is a link key, each holder of an instance of the second key may subsequently use the second key instance to generate one or more encryption/decryption keys to communicate with one another.

Figure 2B:
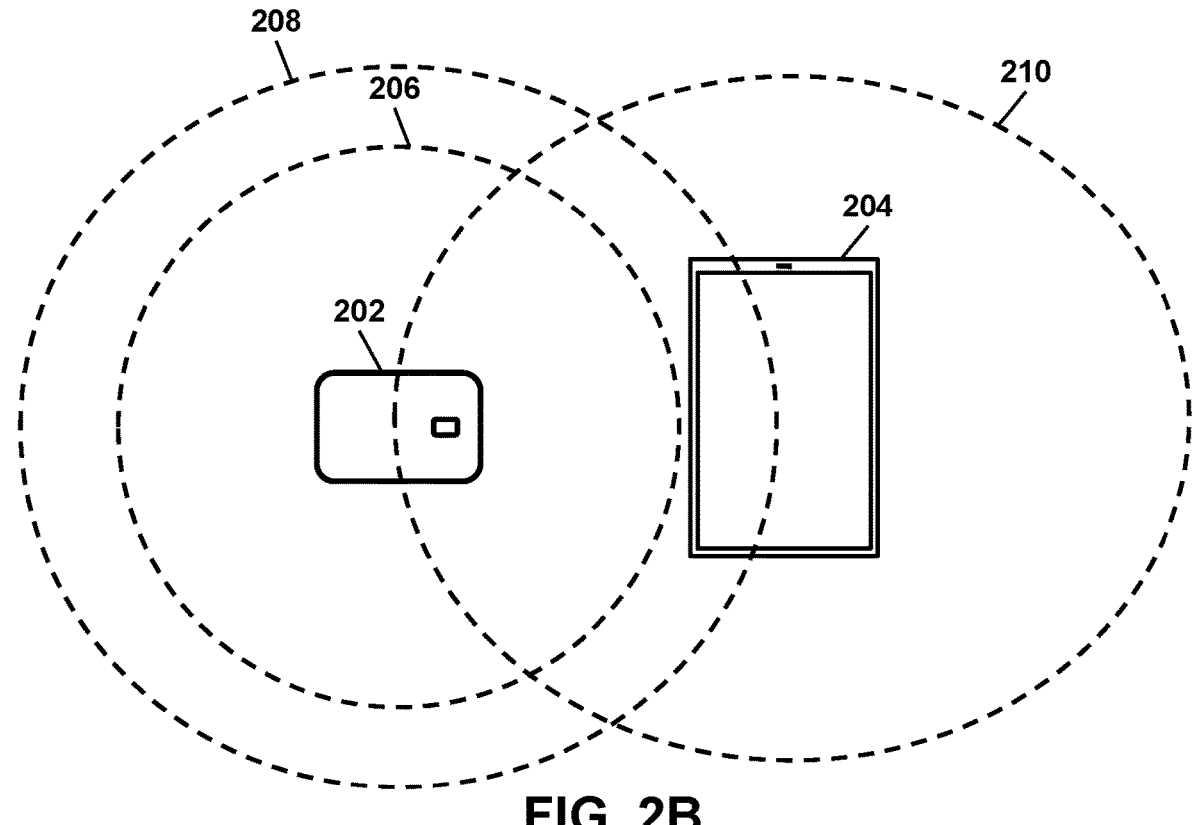

As an example, with respect to FIG. 2B, in response to token 202 detecting that it is outside the first range of the first user device (e.g., mobile device 204 is not within the transmission area 206 of token 202), token 202 may increase its transmission power level (e.g., from a first power level to a second power level) and transmit the key generation input data (e.g., a randomly-generated PIN for generating the second key) at the increased transmission power level (e.g., corresponding to transmission region 208) to the mobile device 204. Likewise, if mobile device 204 detects that it is outside the first range of the token 202, mobile device 204 may increase its transmission power level to confirm receipt or otherwise communicate with the token 202 (e.g., by increasing its power level to a range corresponding to transmission area 210).

In some embodiments, model subsystem 116 may train or configure one or more prediction models to facilitate one or more embodiments described herein. As an example, such models may be trained or configured to perform the foregoing functions by respectively mutually mapping input data and output data in nonlinear relationships based on learning (e.g., deep learning). Model subsystem may store prediction models, user profile information (e.g., indicating one or more user accounts, location histories of the users, preferences of the users, etc.), reference feedback information (e.g., feedback related to thresholds times, feedback related to locations or preferences, or other feedback), or other information at one or more databases (e.g., database(s) 132). In one use case, where a prediction model being trained is a neural network or other machine learning model, model subsystem 116 may provide as input to the machine learning model a collection of locations (e.g., locations visited by a user, locations visited by one or more other users similar to the user, etc.) to cause the machine learning model to predict one or more labels for the locations (e.g., "safe" location, "semi-safe," "unsafe," no-label indication, "home," "work," X/Y score rating, a label indicating that automated deactivation or notification should not apply, or other label), one or more threshold times associated with actions (e.g., notifications, deactivation procedures, etc.) to be applied when a token of the user is at a given location, or other predictions. Model manager subsystem 114 may provide reference information (e.g., labels or threshold times applied to the locations by the user or other users, labels or threshold times determined to be accurate with respect to the locations, etc.) to the machine learning model. The machine learning model may assess its predicted outputs (e.g., predicted labels) against the reference information and update its configurations (e.g., weights, biases, or other parameters) based on its assessment of its predicted outputs. The foregoing operations may be performed with additional location information, additional reference information to further train the machine learning model (e.g., by providing such information as input and reference feedback to train the machine learning model, thereby enabling the machine learning model to further update its configurations).

In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 4C:
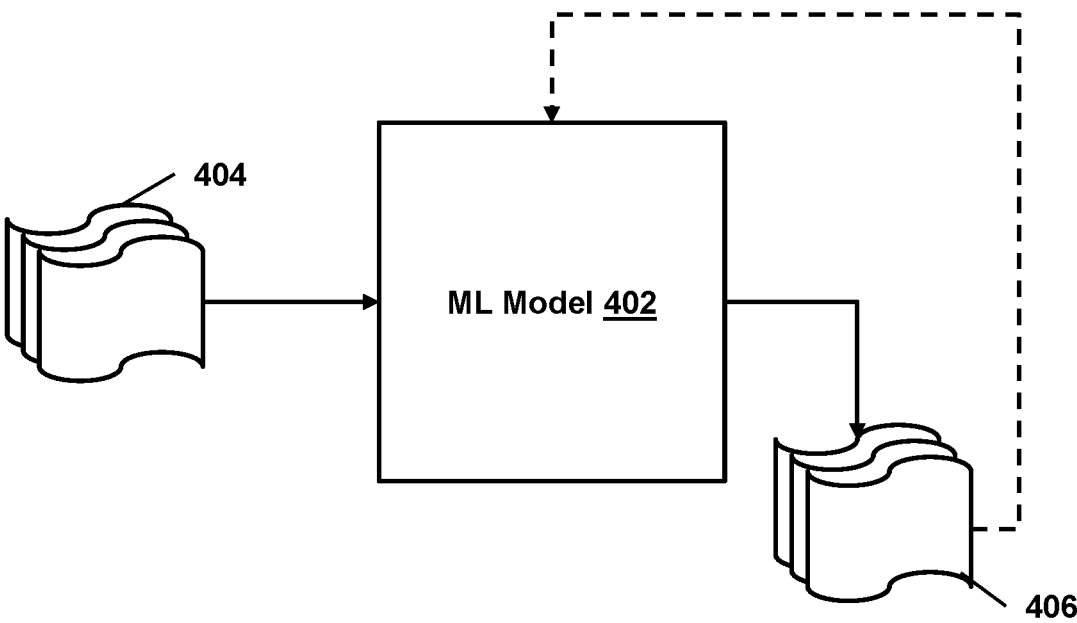
FIG. 4C shows a machine learning model configured to facilitate proximity-based deactivation or activation related to a token, in accordance with one or more embodiments.

As an example, with respect to FIG. 4C, machine learning model 402 may take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure forward and backward connections may be provided. The links are also referred to as connections or connection weights, as referring to the hardware implemented connections or the corresponding "connection weights" provided by those connections of the neural network. During training and implementation such connections and connection weights may be selectively implemented, removed, and varied to generate or obtain a resultant neural network that is thereby trained and that may be correspondingly implemented for the trained objective, such as for any of the above example recognition objectives.

Example Flowcharts

FIGS. 5 and 6 are example flowcharts of processing operations of methods that enable the various features and functionality of the system as described in detail above. The processing operations of the methods presented below are intended to be illustrative and non-limiting. In some embodiments, for example, the methods may be accomplished with one or more additional operations not described, and/or without one or more of the operations discussed. Additionally, the order in which the processing operations of the method are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a flowchart of a method 500 of facilitating proximity-based deactivation or activation related to a token, in accordance with one or more embodiments. In an operation 502, one or more range-related threshold times and one or more encryption/decryption keys related to a token may be stored. As an example, the token may store a first threshold time corresponding to a first action (e.g., generation of a first range-related indication when the token is outside a first range of a first user device), a second threshold time corresponding to a second action (e.g., token use deactivation, exhibition of a token condition, etc.), and so on. The token may also store a first key for encrypting or decrypting messages intended for or from the first user device, a second key for encrypting or decrypting messages intended for or from a second user device, etc. In one use case, at least one of the stored keys (e.g., the first key) may be a primary key, and at least another one of the stored keys (e.g., the second key) may be a secondary key.

In an operation 504, a range-related indication may be generated. As an example, the range-related indication may be generated in response to the token being outside the first range of the first user device for at least the first threshold time. The range-related indication may indicate that the token is not within the first range of the first user device. In one use case, where the range-related indication is generated by the token, the token may detect that the token has been outside of the first range of the first user device for the first threshold time based on a determination that the token has not obtained a response from the first user device (e.g., a response to a message transmitted by the token at a first transmission power level corresponding to the first range) for an amount of time greater than or equal to the first threshold time. Based on such detection, the token may increase a transmission power level of the token (e.g., from a first power level to a second power level) and transmit the range-related indication at the increased transmission power level to the first user device. In a further use case, if no response is obtained from the first user device (e.g., after a predetermined number of attempts or threshold time), the token may continue to increase the transmission power level of the token (e.g., from the current power level to a higher power level) and retransmit the range-related indication at the further-increased transmission power level until a maximum transmission power level (e.g., a manufacturer-configured maximum, a user-defined maximum, etc.) is reached or other criteria is met (e.g., a response is obtained from the first user device, the token receives an indication to do otherwise via another device, etc.).

In an operation 506, use related to the token may be deactivated. As an example, the use related to the token may be deactivated in response to the token being outside the first range of the first user device for at least a second threshold time greater than the first threshold time. In one use case, based on detecting that the token has been outside of the first range of the first user device for the second threshold time (e.g., the token has not obtained a response from the first user device for an amount of time greater than or equal to the second threshold time), the token may disable a processing component (e.g., a EMV chip or other chip) of the token for processing a transaction (e.g., such that the processing component of the token is configured to indicate that the token is invalid to any device communicating with the token via the processing component, the processing component of the token is configured to not communicate information with any device even when powered by the other device, etc.). In another use case, based on such detection, the token may apply an electric field across the electrophoretic surface to cause the electrophoretic surface to exhibit a second condition (different from a first condition exhibited by the electrophoretic surface when the related token use is active). As an example, the second condition may include the electrophoretic surface of the token being substantially a single color (e.g., black, white, a color of the surface when no ink is present on the surface, etc.). As another example, the second condition may include a number (e.g., an account number, a card number, etc.) or other data (e.g., account or card owner name, expiration date, card verification value, etc.) presented on the electrophoretic surface of the token being cleared from the electrophoretic surface.

In an operation 508, the use related to the token may be reactivated. As an example, the use related to the token may be reactivated in response to an activation indication being obtained. In one use case, based on the activation indication, the token may enable a processing component (e.g., a EMV chip or other chip) of the token that was disabled (e.g., where the disabling was in response to being outside a range of the first user device for a threshold time). In another use case, based on the activation indication, the token may apply an electric field across an electrophoretic surface of the token to cause the electrophoretic surface to exhibit a default condition. As an example, where the electrophoretic surface was caused to exhibit a first condition (e.g., being substantially a single color, data being cleared from the surface, etc.), the electrophoretic surface may be caused to return to the default condition from the first condition.

Moreover, in one use case, the token may obtain the activation indication from the first user device (e.g., directly via the first user device when the first user device becomes within a wireless range of the token again, via another device that is in communication with the first user device and within a wireless range of the token, etc.). In another use case, the token may obtain the activation indication from a second user device of a second user (different from a first user of the first user device). As an example, the second user device may transmit the activation indication to the token based on a corresponding approval occurring via the first user device (e.g., a user approval for the reactivation). As another example, based on the corresponding approval occurring via the first user device, the first user device may transmit, to the second user device, an instruction for sending the activation indication to the token.

In some embodiments, the token may create and store a first key for facilitating encryption/decryption of messages intended for or from the first user device, and the token may also create and store a second key for encryption/decryption of messages intended for or from another user device (e.g., the second user device of the second user). As an example, with respect to the second key, the token may obtain key generation input data (for generating the second key) from the first user device and use the key generation input data to generate the second key. In one use case, where the second user device transmits the activation indication to the token, the second user device may transmit the activation indication as part of an encrypted message that is encrypted based on the instance of the second key (e.g., encrypted at the first user device, the second user device, etc.). Upon obtaining the encrypted message, the token may decrypt the encrypted message based on the second key stored at the token.

As another example, with respect to the second key, based on detecting that the token is outside the first range of the first user device for at least a given threshold time (e.g., the first threshold time, the second threshold time, or another threshold time), the token may generate a message that includes the range-related indication and the key generation input data (for generating the second key), and the token may transmit the message at a higher transmission power level (corresponding to a range higher than the first range) to the first user device. Due to the higher range, the first user device may receive the key generation input data from the token, and the token and the first user device (or another device to which the key generation input is provided) may each use the key generation input data to generate an instance of the second key (such that each instance is an exact copy of the second key). Each holder of an instance of the second key may subsequently use the second key instance to communicate with one another.

FIG. 6 shows a flowchart of a method 600 of facilitating multi-encryption using primary and secondary keys stored at a token, in accordance with one or more embodiments. In an operation 602, a first encrypted message (including an activation indication) may be obtained by a second user device. As an example, the first message may be encrypted based on a primary key stored at a token and a first user device. In one use case, the primary key may be a primary link key (e.g., generated during an initialization process between the token and the first user device), and the token and the first user device may each use their respective copy of the primary link key to generate a first encryption key. The first user device may use the first encryption key as a key input to an encryption algorithm to encrypt a message (including the activation indication) to produce the first encrypted message.

In an operation 604, a second encrypted message may be generated by the second user device based on the first encrypted message and a secondary key that is stored at the token and the second user device. As an example, the second user device may encrypt the first encrypted message based on the secondary key. In one use case, the secondary key may be a secondary link key (e.g., generated during an initialization process between the token and the second user device, generated by the token and the first user device during a secondary link key generation process, etc.), and the token and the second user device may each use their respective copy of the secondary link key to generate a second encryption key. The second user device may use the second encryption key as a key input to an encryption algorithm to encrypt a message (including the first encrypted message) to produce the second encrypted message.

In an operation 606, the second encrypted message may be transmitted to the token to activate use related to the token. In one use case, the token may use the second encryption key (which is also a decryption key) as a key input to a decryption algorithm to obtain the first encrypted message. The token may use the first encryption key (which is also a decryption key) as a key input to the decryption algorithm to obtain the activation indication. Based on the activation indication, the token may activate the use related to the token. As an example, the token may enable a processing component (e.g., a EMV chip or other chip) of the token that was disabled. As another example, the token may apply an electric field across an electrophoretic surface of the token to cause the electrophoretic surface to exhibit a default condition (e.g., that enables the token to be scanned or otherwise read by one or more other devices).

In some embodiments, the various computers and subsystems illustrated in FIG. 1 may include one or more computing devices that are programmed to perform the functions described herein. The computing devices may include one or more electronic storages (e.g., database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: based on a token being outside of a first range of a first user device for at least a second threshold time greater than a first threshold time, causing deactivation of use related to the token, wherein a range-related indication was generated in response to the token being outside the first range of the first user device for at least the first threshold time; and based on a corresponding approval occurring via the first user device, causing reactivation of the use related to the token.

2. The method of the preceding embodiment, wherein the range-related indication indicates that the token is not within a range of the first user device.

3. The method of any of the preceding embodiments, further comprising: causing an activation indication to be sent to (or obtained by) the token, wherein the activation indication causes the token to exhibit the first condition in lieu of exhibiting the second condition.

4. The method of the preceding embodiment, further comprising: storing a first key for decrypting messages obtained from the first user device or encrypting messages to be sent from the first user device to the token; and obtaining, via the first user device, key generation input data for generating a second key, wherein the activation indication is obtained as an encrypted message, the encrypted message being encrypted based on an instance of the second key.

5. The method of the preceding embodiment, wherein the instance of the second key is stored at a second user device, and wherein the instance stored at the second user device was generated based on an instance of the key generation input data.

6. The method of any of the preceding embodiments 4-5, wherein the second key is invalidated at an expiration time associated with the second key.

7. The method of any of the preceding embodiments 3-6, wherein the activation indication is sent to the token from a second user device based on the corresponding approval occurring via the first user device.

8. The method of the preceding embodiment, further comprising: based on the corresponding approval occurring via the first user device, transmitting, to the second user device, an instruction for sending the activation indication to the token.

9. The method of any of the preceding embodiments, wherein the token stores the second threshold time.

10. The method of any of the preceding embodiments, wherein the token stores at least one key (e.g., a primary key) for decrypting messages obtained from the first user device and at least another key (e.g., a secondary key) for decrypting messages obtained from another user device.

11. The method of any of the preceding embodiments, wherein, in response to the token being outside of the first range of the first user device for at least the first or second threshold times, a surface (e.g., electrophoretic surface) of the token becomes substantially a single color.

12. The method of any of the preceding embodiments, wherein, in response to the token being outside of the first range of the first user device for at least the first or second threshold times, a card number or other data presented on a surface (e.g., electrophoretic surface) of the token is cleared from the surface.

13. The method of any of the preceding embodiments, wherein the deactivation of the use related to the token comprises deactivating use of a card number or account associated with the token based on the token being outside of the first range of the first user device for at least the second threshold time.

14. The method of any of the preceding embodiments, wherein the token comprises a transaction card.

15. The method of any of the preceding embodiments, wherein the first user device comprises a first mobile device.

16. A tangible, non-transitory, machine-readable medium storing instructions that, when executed by a data processing apparatus, cause the data processing apparatus to perform operations comprising those of any of the foregoing method embodiments.

17. A system comprising: one or more processors; and memory storing instructions that, when executed by the processors, cause the processors to effectuate operations comprising those of any of the foregoing method embodiments.

What is claimed is:

1. A short-range wireless transaction card comprising:
an electrophoretic surface;
storage circuitry storing (i) a second outside-of-range threshold time greater than a first outside-of-range threshold time, wherein, in response to the transaction card being outside of a first range of a primary mobile device associated with a primary user for greater than the first outside-of-range threshold time, a range-related indication is generated, (ii) a primary link key used for decrypting messages obtained from the primary mobile device, and (iii) one or more secondary link keys used for decrypting messages obtained from one or more secondary mobile devices; and control circuitry configured to perform operations comprising:

in response to the transaction card being outside of the first range of the primary mobile device for greater than the second outside-of-range threshold time:

applying an electric field across the electrophoretic surface to cause the electrophoretic surface to exhibit a first condition comprising a majority of the electrophoretic surface being a single color, wherein use of the transaction card is deactivated in response to the transaction card being outside of the first range of the primary mobile device for greater than the second outside-of-range threshold time;

obtaining, based on at least one of the one or more secondary link keys, an activation indication from a secondary mobile device of the one or more secondary mobile devices, wherein the activation indication is obtained from the secondary mobile device in response to a user approval of the primary user being obtained at the primary mobile device; and in response to obtaining the activation indication from the secondary mobile device:

applying an electric field across the electrophoretic surface to cause the electrophoretic surface to exhibit a default condition different from the first condition, wherein the use of the transaction card is reactivated in response to the user approval being obtained at the primary mobile device.

2. The transaction card of claim 1, the operations further comprising:

generating, based on a passcode obtained from the primary mobile device, a secondary link key of the one or more secondary link keys that is associated with an expiration time, wherein the storage circuitry stores the secondary link key after generation of the secondary link key; and subsequent to obtaining the activation indication, invalidating the secondary link key based on a current time matching the expiration time, wherein obtaining the activation indication comprises using the secondary link key to decrypt an encrypted message to obtain the activation indication, the encrypted message being encrypted by the secondary mobile device of the one or more secondary mobile devices based on a link key instance of the secondary link key stored at the secondary mobile device, wherein the link key instance stored at the secondary mobile device was generated based on an instance of the passcode.

3. A method comprising:

in response to a transaction card being outside of a first range of a first mobile device associated with a first user for at least a first outside-of-range threshold time from a first time and less than a second outside-of-range threshold time greater than the first outside-of-range threshold time, generating a range-related indication causing a notification to be presented at the first mobile device;

storing, by the transaction card, the second outside-of-range threshold time greater than the first outside-ofrange threshold time and a primary link key used for decrypting messages obtained from the first mobile device;

in response to the transaction card being outside of the first range of the first mobile device for at least the second outside-of-range threshold time from the first time, generating a deactivation signal for deactivating use of the transaction card, the transaction card changing a surface of the transaction card from exhibiting a first physical condition to exhibiting a second physical condition;

in response to a user approval being obtained at the first mobile device after the transaction card has been outside of the first range of the first mobile device for at least the second outside-of-range threshold time from the first time, generating a reactivation signal for reactivating the use of the transaction card, the reactivation signal causing an activation indication to be sent from a second mobile device associated with a second user to the transaction card;

storing, by the transaction card, a secondary link key used for decrypting messages obtained from the second mobile device; and causing, by the activation indication, the surface of the transaction card to exhibit the first physical condition.

4. The method of claim 3, wherein, in response to the transaction card being outside of the first range of the first mobile device for at least the second outside-of-range threshold time, applying an electric field across an electrophoretic surface of the transaction card to cause a majority of the electrophoretic surface to become a single color.

5. The method of claim 3, wherein, in response to the transaction card being outside of the first range of the first mobile device for at least the second outside-of-range threshold time from the first time, a card number presented on an electrophoretic surface of the transaction card is cleared from the electrophoretic surface.

6. The method of claim 3, further comprising:

encrypting the messages to be sent from the first mobile device to the transaction card; and obtaining, via the first mobile device, key generation input data for generating the secondary link key, wherein the activation indication is obtained as an encrypted message, the encrypted message being encrypted based on an instance of the secondary link key.

7. The method of claim 6, wherein the instance of the secondary link key is stored at the second mobile device, and wherein the instance stored at the second mobile device was generated based on an instance of the key generation input data.

8. The method of claim 6, wherein the secondary link key is invalidated at an expiration time associated with the secondary link key.

9. The method of claim 3, further comprising:

in response to the user approval being obtained at the first mobile device, transmitting, to the second mobile device, an instruction for sending the activation indication to the transaction card.

10. The method of claim 3, wherein deactivating the use of the transaction card comprises deactivating use of a card number associated with the transaction card in response to the transaction card being outside of the first range of the first mobile device for at least the second outside-of-range threshold time from the first time.

11. A system comprising:

a transaction card comprising:

one or more non-transitory computer-readable media comprising instructions that, when executed by one or more processors, cause operations comprising:

in response to an occurrence of the transaction card being outside of a first range of a first mobile device associated with a first user for at least a first outside-of-range threshold time and less than a second outside-of-range threshold time greater than the first outside-of-range threshold time, generating a range-related indication causing a notification to be presented at the first mobile device, wherein use of the transaction card is not deactivated in connection with the range-related indication, wherein the transaction card stores the second outside-of-range threshold time greater than the first outside-of-range threshold time and a primary link key used for decrypting messages obtained from the first mobile device;

in response to the transaction card being outside of the first range of the first mobile device for at least the second outside-of-range threshold time greater than the first outside-of-range threshold time with respect to the occurrence, generating a deactivation signal for deactivating the use of the transaction card, the transaction card changing a surface of the transaction card from exhibiting a first physical condition to exhibiting a second physical condition; and in response to a user approval being obtained at the first mobile device, generating a reactivation signal for reactivating the use of the transaction card, the reactivation signal causing an activation indication to be sent to the transaction card from a second mobile device, wherein the activation indication causes the surface of the transaction card to exhibit the first physical condition, wherein the transaction card stores a secondary link key used for decrypting messages obtained from the second mobile device.

12. The system of claim 11, wherein, in response to the transaction card being outside of the first range of the first mobile device for at least the second outside-of-range threshold time, applying an electric field across an electrophoretic surface of the transaction card to cause a majority of the electrophoretic surface to become a single color.

13. The system of claim 11, wherein, in response to the transaction card being outside of the first range of the first mobile device for at least the second outside-of-range threshold time with respect to the occurrence, a card number presented on an electrophoretic surface of the transaction card is cleared from the electrophoretic surface.

14. The system of claim 11, the operations further comprising:

encrypting the messages to be sent from the first mobile device to the transaction card; and obtaining, via the first mobile device, key generation input data for generating the secondary link key, wherein the activation indication is obtained as an encrypted message, the encrypted message being encrypted based on an instance of the secondary link key.

15. The system of claim 14, wherein the instance of the secondary link key is stored at the second mobile device, and wherein the instance stored at the second mobile device was generated based on an instance of the key generation input data.

16. The system of claim 14, wherein the secondary link key is invalidated at an expiration time associated with the secondary link key.

17. The system of claim 11, the operations further comprising:

in response to the user approval being obtained at the first mobile device, transmitting, to the second mobile device, an instruction for sending the activation indication to the transaction card.

18. The system of claim 11, wherein deactivating the use of the transaction card comprises deactivating use of a card number associated with the transaction card in response to the transaction card being outside of the first range of the first mobile device for at least the second outside-of-range threshold time with respect to the occurrence.

* * * * *